(12) United States Patent
Hanson

(10) Patent No.: US 7,721,551 B2
(45) Date of Patent: May 25, 2010

(54) FAN VARIABLE AREA NOZZLE FOR A GAS TURBINE ENGINE FAN NACELLE

(75) Inventor: Russell B. Hanson, Jupiter, FL (US)

(73) Assignee: United Technologies Corporation, Hartford, CT (US)

(*) Notice: Subject to any disclaimer, the term of this patent is extended or adjusted under 35 U.S.C. 154(b) by 913 days.

(21) Appl. No.: 11/478,009

(22) Filed: Jun. 29, 2006

(65) Prior Publication Data
US 2008/0000235 A1  Jan. 3, 2008

(51) Int. Cl.
*F02K 1/00* (2006.01)

(52) U.S. Cl. .................. 60/771; 60/226.1; 239/265.33; 239/265.37

(58) Field of Classification Search ........... 60/226.1, 60/771; 239/265.33, 265.37, 265.39; 415/162
See application file for complete search history.

(56) References Cited

U.S. PATENT DOCUMENTS

| | | | |
|---|---|---|---|
| 2,934,966 A * | 5/1960 | Wood ............... 74/105 |
| 4,044,973 A | 8/1977 | Moorehead |
| 4,147,027 A | 4/1979 | Greathouse |
| 4,205,813 A | 6/1980 | Evans et al. |
| 4,301,980 A | 11/1981 | Bradfield et al. |
| 4,410,150 A | 10/1983 | Lahti |
| 4,466,587 A | 8/1984 | Dusa et al. |
| 4,505,443 A | 3/1985 | Bradfield et al. |
| 5,029,514 A * | 7/1991 | Pickard ............... 91/49 |
| 5,261,605 A * | 11/1993 | McLafferty et al. .... 239/265.35 |
| 5,315,821 A | 5/1994 | Dunbar et al. |
| 5,722,231 A | 3/1998 | Porte |
| 5,743,488 A | 4/1998 | Rolston et al. |
| 5,806,302 A | 9/1998 | Cariola et al. |
| 6,212,877 B1 * | 4/2001 | Renggli ............... 60/232 |
| 6,318,070 B1 * | 11/2001 | Rey et al. ............ 60/226.3 |
| 6,340,135 B1 | 1/2002 | Barton |
| 6,378,781 B1 * | 4/2002 | Vicario ............... 239/265.39 |
| 6,769,868 B2 * | 8/2004 | Harrold .............. 415/150 |
| 6,820,410 B2 | 11/2004 | Lair |
| 6,983,588 B2 | 1/2006 | Lair |
| 7,032,835 B2 * | 4/2006 | Murphy et al. ....... 239/128 |
| 7,458,221 B1 * | 12/2008 | Arnold et al. ........ 60/771 |
| 2005/0126174 A1 * | 6/2005 | Lair ................. 60/771 |
| 2007/0234728 A1 * | 10/2007 | Peters ............... 60/771 |
| 2008/0001039 A1 * | 1/2008 | Winter et al. ........ 244/53 R |
| 2008/0028763 A1 * | 2/2008 | Schwarz et al. ...... 60/771 |
| 2008/0092548 A1 * | 4/2008 | Morford et al. ...... 60/771 |
| 2008/0302907 A1 * | 12/2008 | Schafer ............. 244/54 |

* cited by examiner

*Primary Examiner*—Michael Cuff
*Assistant Examiner*—Phutthiwat Wongwian
(74) *Attorney, Agent, or Firm*—Carlson Gaskey & Olds PC (57) ABSTRACT

A fan variable area nozzle (FVAN) selectively rotates a synchronizing ring relative the static ring to adjust a flap assembly through a linkage to vary an annular fan exit area through which fan air is discharged. By adjusting the FVAN, engine thrust and fuel economy are maximized during each flight regime.

18 Claims, 11 Drawing Sheets

FAN VARIABLE AREA NOZZLE FOR A GAS TURBINE ENGINE FAN NACELLE

BACKGROUND OF THE INVENTION

The present invention relates to a gas turbine engine, and more particularly to a turbofan gas turbine engine having a variable area nozzle structure within the fan nacelle thereof.

In an aircraft turbofan engine, air is pressurized in a compressor and mixed with fuel in a combustor for generating hot combustion gases which flow downstream through turbine stages that extract energy therefrom. A high pressure turbine powers the compressor, and a low pressure turbine powers a fan disposed upstream of the compressor.

Combustion gases are discharged from the core engine through a core exhaust nozzle, and fan air is discharged through an annular fan exhaust nozzle defined at least partially by a nacelle surrounding the core engine. A majority of propulsion thrust is provided by the pressurized fan air discharged through the fan exhaust nozzle, the remaining thrust provided from the combustion gases discharged through the core exhaust nozzle.

It is known in the field of aircraft gas turbine engines that optimum performance of the engine may be achieved during different flight conditions of an aircraft by tailoring the exit area for specific flight regimes such as take off, cruise maneuver, and the like. In combat aircraft, the necessity of high performance requires the expense, weight, and increased complexity of a variable area nozzle structure through which all exhaust is directed. However, such considerations have precluded the incorporation of a variable area nozzle for the fan air of a turbofan gas turbine engine propulsion system typical of commercial and military transport aircraft.

Accordingly, it is desirable to provide an effective, relatively inexpensive variable area nozzle for a gas turbine engine fan nacelle.

SUMMARY OF THE INVENTION

A fan variable area nozzle (FVAN) according to the present invention includes a synchronizing ring, a static ring, and a flap assembly mounted within a fan nacelle. The flap assembly is pivotally mounted to the static ring at a hinge and linked to the synchronizing ring through a linkage. The synchronizing ring is mounted within a multitude of slider tracks that are affixed within the fan nacelle. An actuator assembly selectively rotates the synchronizing ring relative the static ring to adjust the flap assembly through the linkage to vary the annular fan exit area defined by the FVAN through which fan air is discharged.

The linkage for each flap of the flap assembly generally includes a hinge beam which extends from each flap, a slider block assembly and a hinge pin mounted to the slider block assembly. The slider blocks are located within a slot formed in the synchronizing ring. The slots formed within the synchronizing ring are non-circumferentially located about the engine longitudinal centerline axis.

In operation, the actuator assembly rotates the synchronizing ring circumferentially about the engine longitudinal centerline axis. The slider block assembly moves within the slot such that a rod which extends from the hinge beam translates slider block radial motion to a rod tangential moment about the hinge. The resulting flap assembly moment about the flap hinge varies the diameter of the flap assembly and thus the annular fan exit area within the fan nacelle. By adjusting the FVAN, engine thrust and fuel economy are maximized during each flight regime.

The present invention therefore provides an effective, relatively inexpensive variable area nozzle for a gas turbine engine fan nacelle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
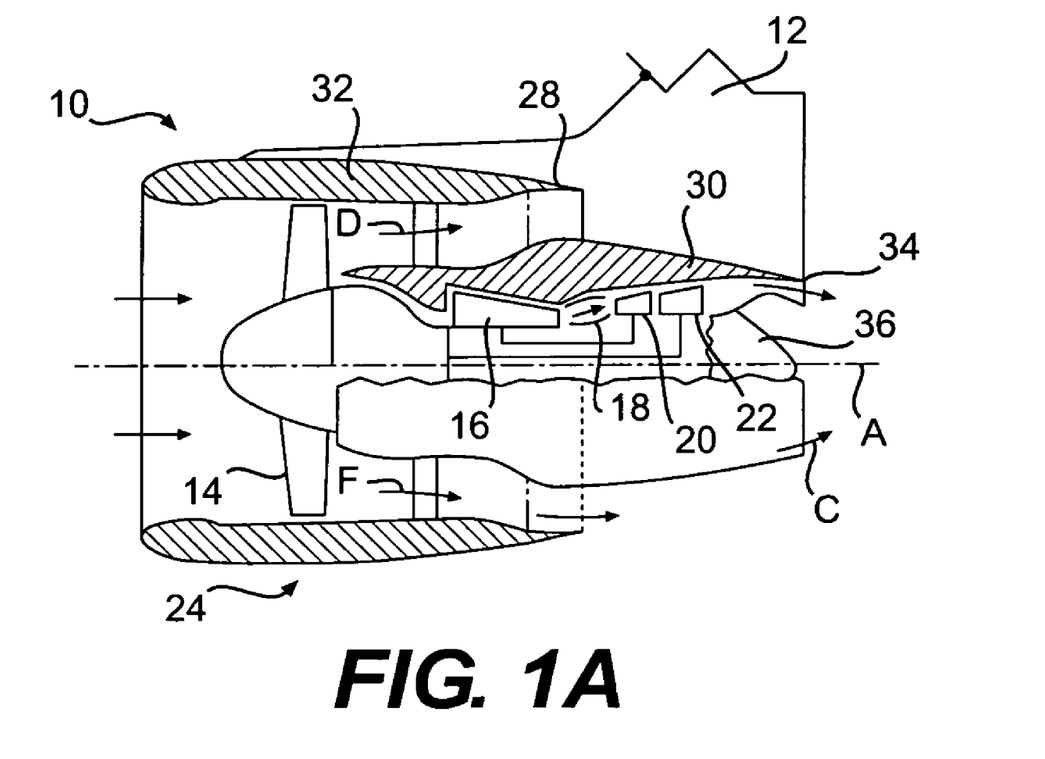
FIG. 1A is a general perspective view an exemplary turbo fan engine embodiment for use with the present invention.

FIG. 1A illustrates a general partial fragmentary view of a gas turbofan engine 10 suspended from an engine pylon 12 as typical of an aircraft designed for subsonic operation. The engine 10 is preferably a high-bypass turbofan aircraft engine. The engine 10 typically includes in serial flow communication a fan 14 with a low pressure compressor, a high pressure compressor 16, an annular combustor 18, high pressure turbine 20, and low pressure turbine 22. During operation, air is pressurized in the compressor and mixed with fuel in the combustor for generating hot combustion gases which flow through the high and low pressure turbines that extract energy therefrom. The high pressure turbine powers the compressor through a shaft therebetween, and the low pressure turbine powers the fan through another shaft therebetween.

The exemplary turbofan engine 10 is in the form of a high bypass ratio engine mounted within a nacelle assembly 24 in which most of the air pressurized by the fan bypasses the core engine itself for generating propulsion thrust. The fan air F is discharged from the engine 10 through a fan variable area nozzle (FVAN) 28 (also illustrated in FIGS. 1B and 1C) defined radially between a core nacelle 30 and a fan nacelle 32. The core exhaust gases C are discharged from the core engine through a core exhaust nozzle 34 defined between the core nacelle 30 and a center plug 36 (FIG. 1C) disposed coaxially therein around an engine longitudinal centerline axis A of the engine 10 and nacelle The FVAN 28 of the fan nacelle 32 coaxially or concentrically surrounds the core nacelle 30 to define a variable diameter nozzle downstream of an annular fan duct D for discharging axially the fan air F pressurized by the upstream fan 14.

Figure 2A:
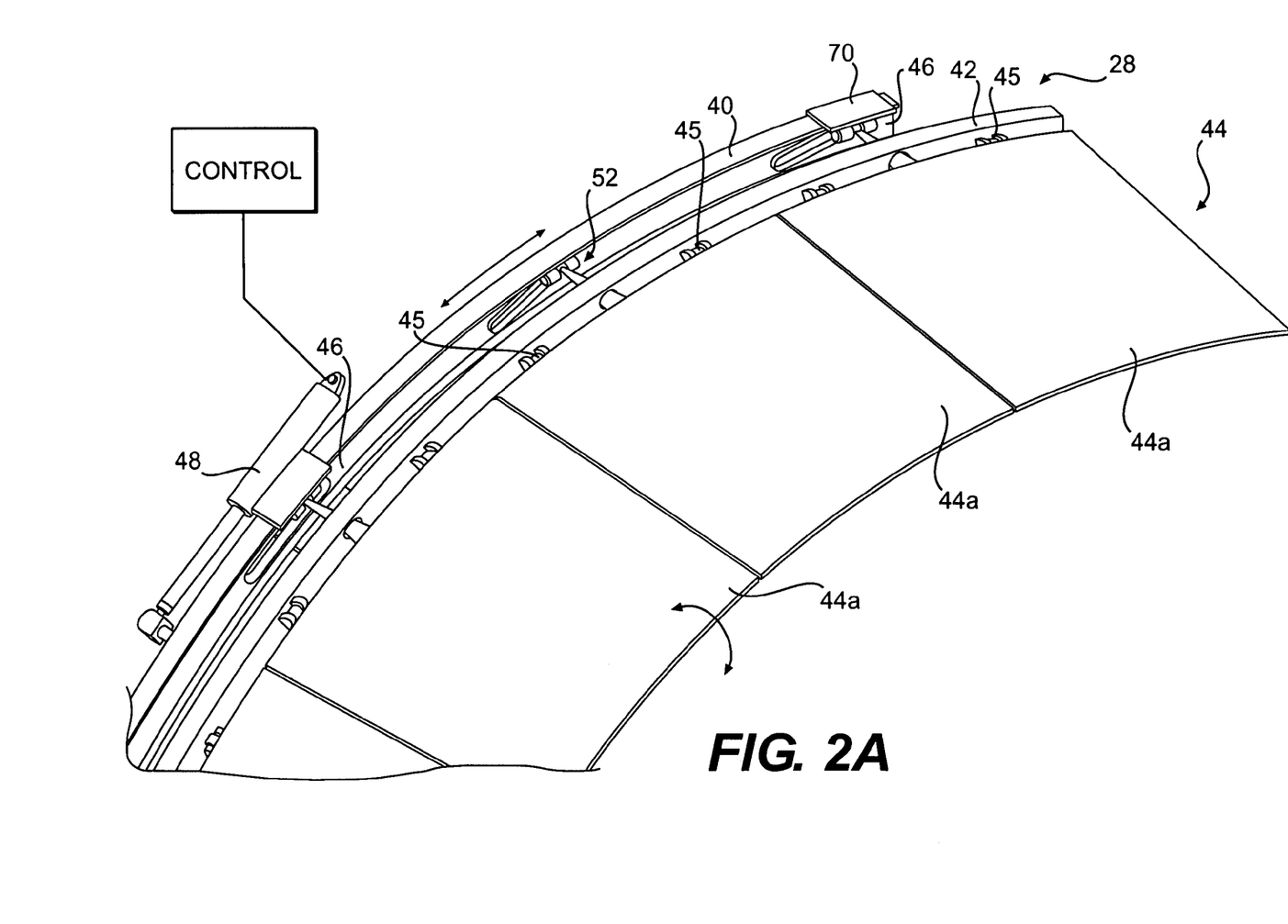
FIG. 2A is a perspective view of a section of the FVAN.

Referring to FIG. 2A, a segment of the FVAN 28 generally includes a synchronizing ring 40, a static ring 42, and a flap assembly 44. The flap assembly 44 is pivotally mounted to the static ring 42 at a multitude of hinges 45 and linked to the synchronizing ring 40 through a linkage 46. An actuator assembly 48 (only one shown) selectively rotates the synchronizing ring 40 relative the static ring 42 to adjust the flap assembly 44 through the linkage 46 to vary the area defined by the FVAN 28 through which the fan air F is discharged.

Figure 2B:
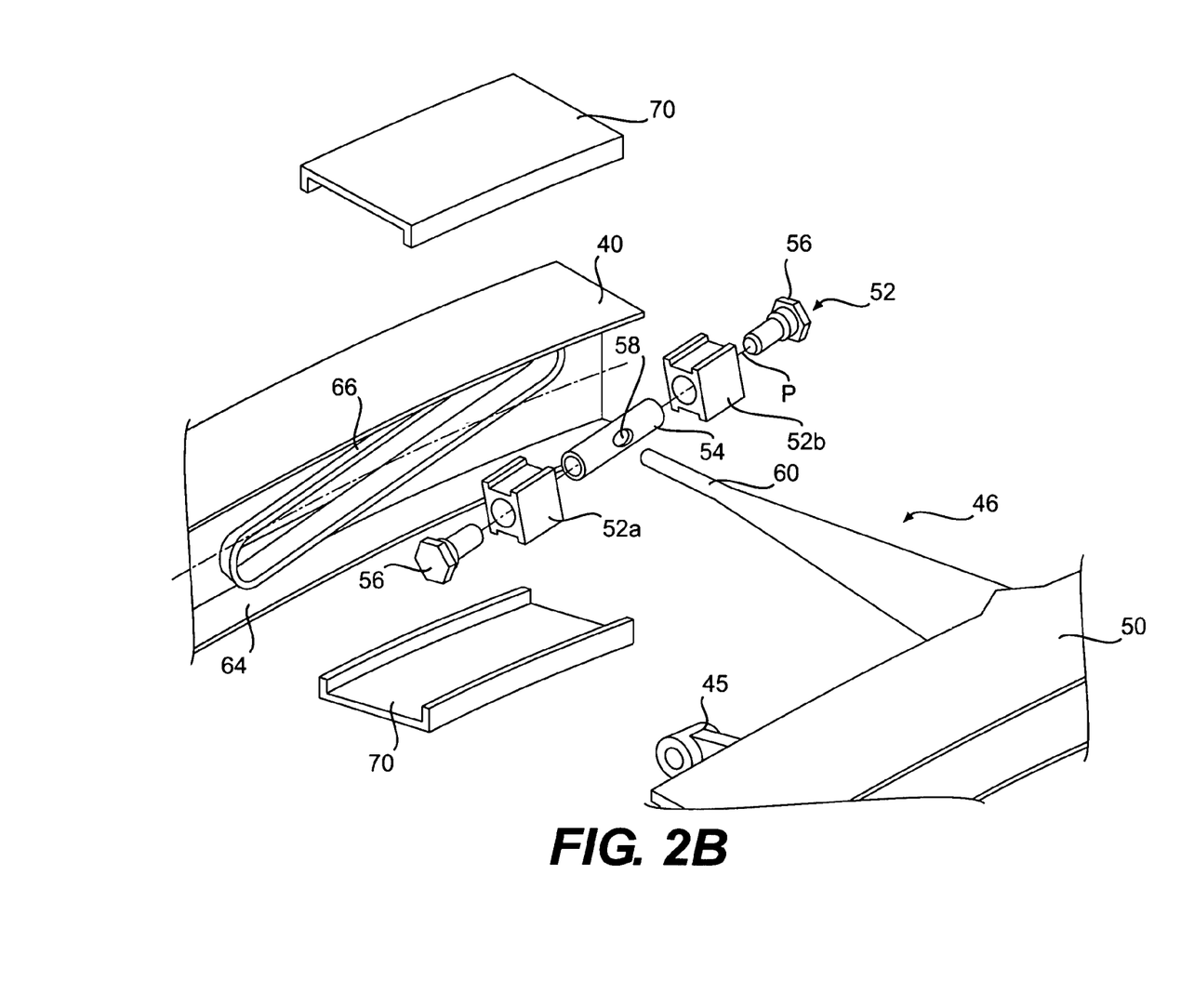
FIG. 2B is an exploded view of the linkage for one flap of the FVAN.

Referring to FIG. 2B, the linkage 46 for each flap 44a of the flap assembly 44 generally includes a hinge beam 50, a slider block assembly 52 and a hinge pin 54 mounted to the slider block assembly 52 through a fastener 56. The slider block assembly 52 preferably includes a first slider block 52a and a second slider block 52b between which the hinge pin 54 is mounted through the fasteners 56 for rotation about the longitudinal axis P thereof. The hinge pin 54 includes an aperture 58 which receives a hinge beam rod 60.

Figure 3A:
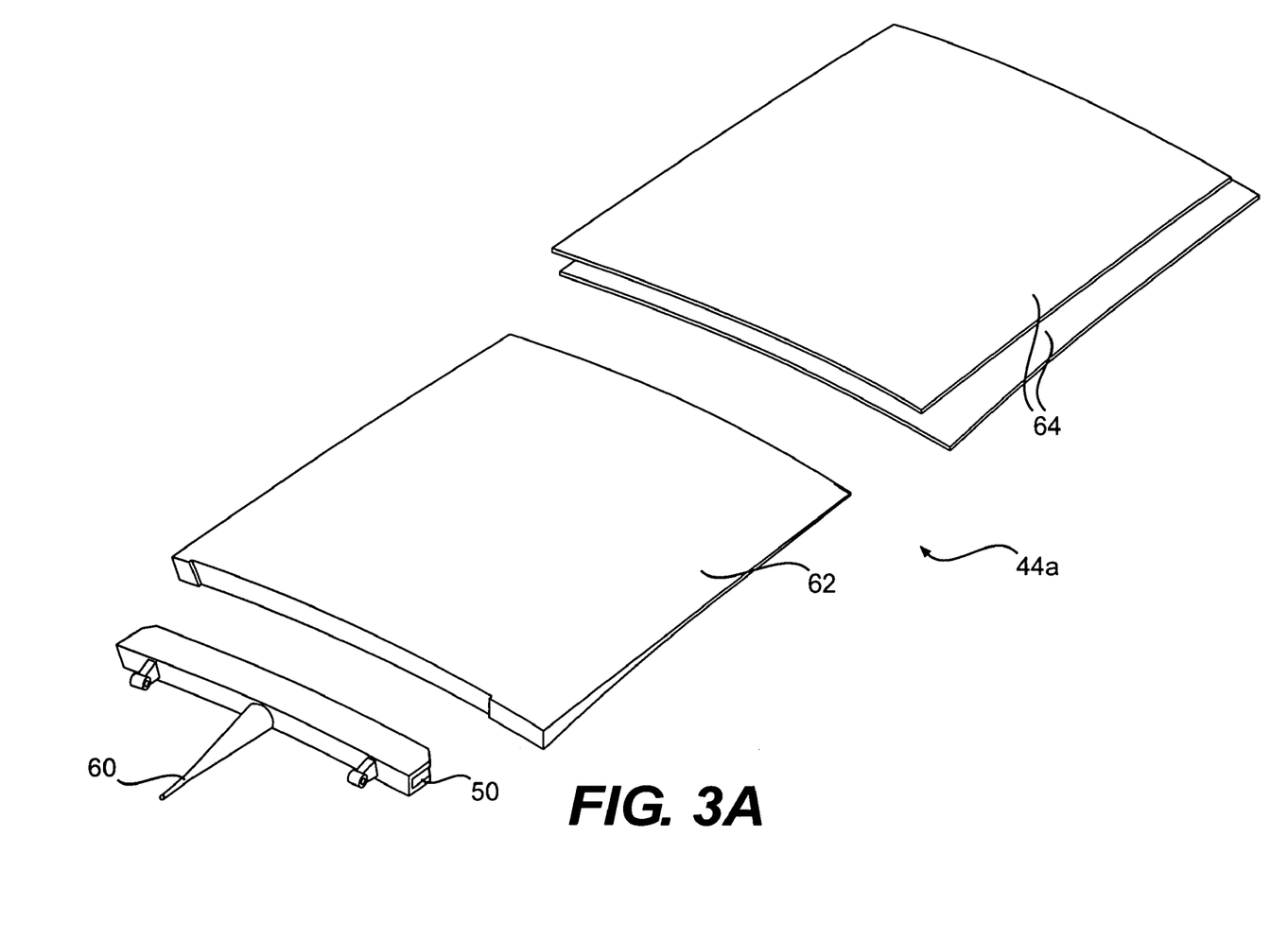
FIG. 3A is an exploded view of one flap of the FVAN.
Figure 3B:
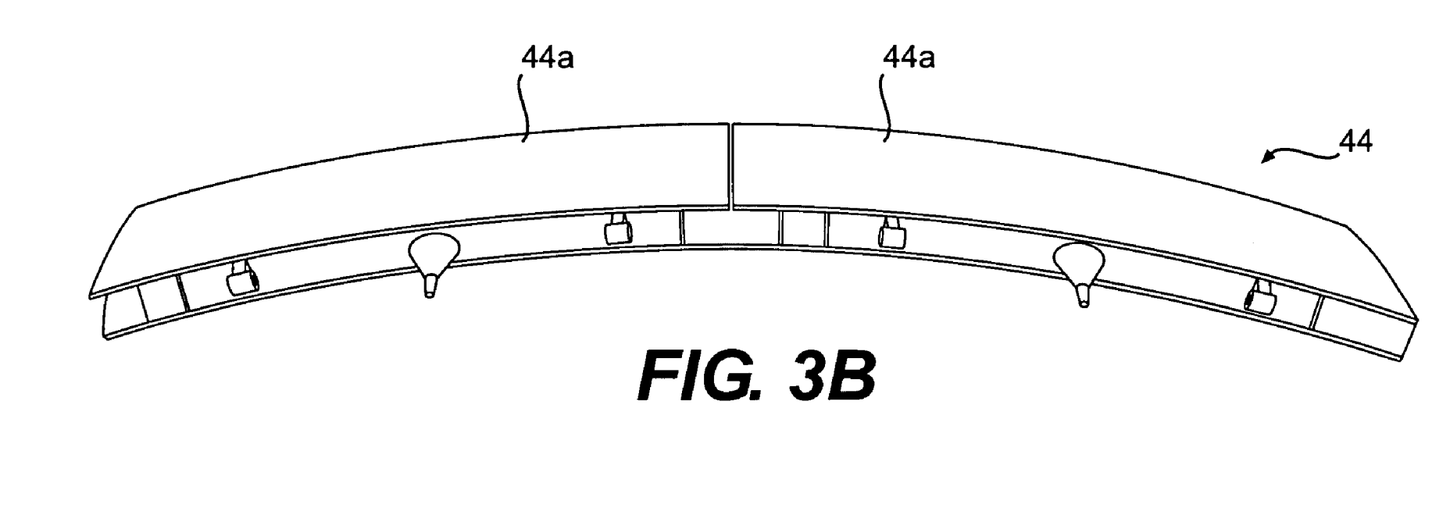
FIG. 3B is a rear view illustrating the sliding tongue and groove interface between two flaps of the flap assembly.

Each flap 44a preferably includes a machined aluminum honeycomb core 62 and carbon fiber skins 64 mounted to the hinge beam 50 (FIG. 3A). Each flap 44a includes a nested tongue and groove arrangement such that the flaps are nested when assembled (FIG. 3B). That is, each flap 44a engages the adjacent flaps 44a to provide a circumferential seal which defines the exit area.

Figure 2C:
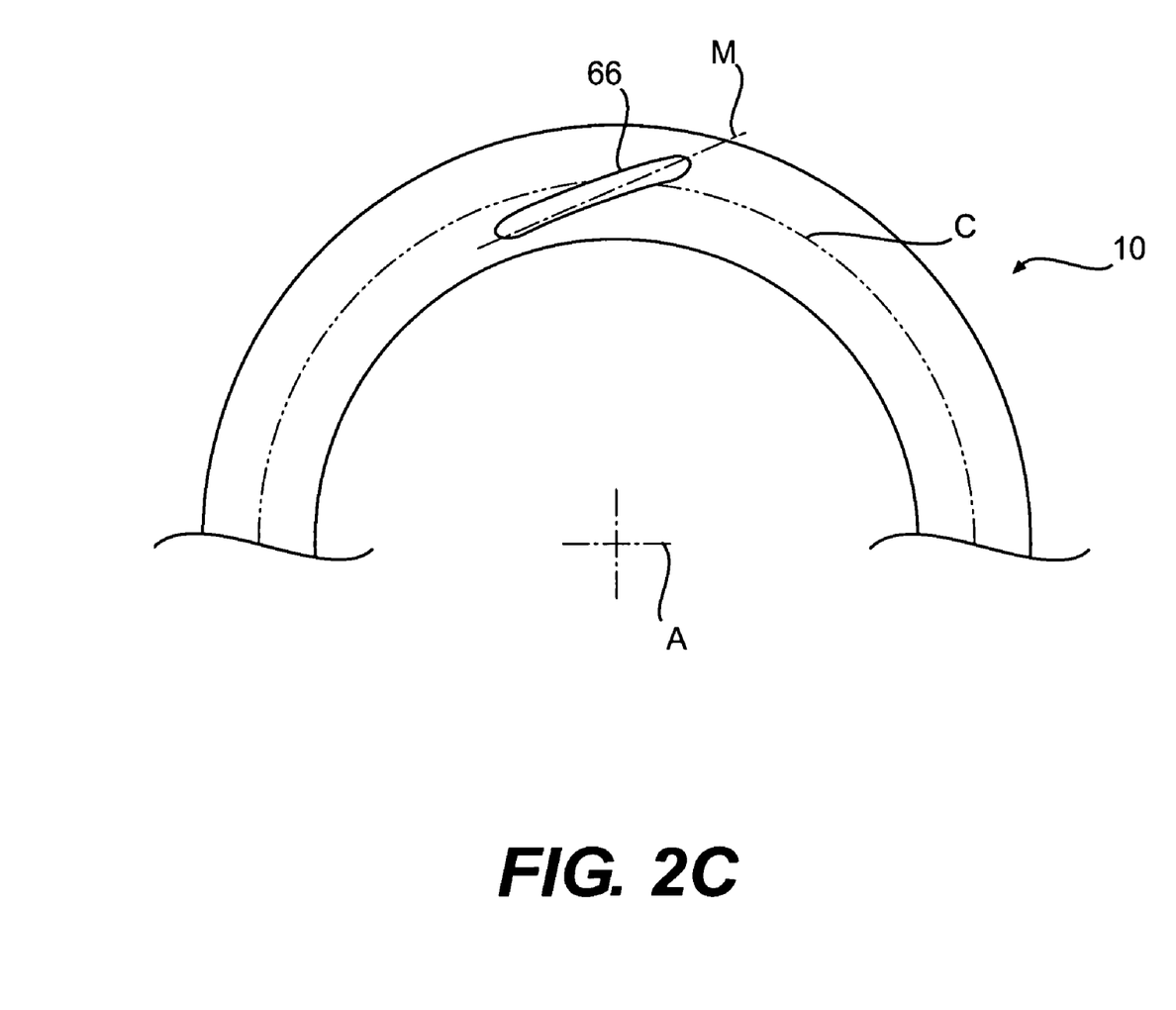
FIG. 2C is a schematic view of a slot within the synchronization ring of the FVAN.

The slider blocks 52a, 52b are located within a slot 66 formed in the synchronizing ring 40. The slots 66 formed within the synchronizing ring 40 are non-circumferentially located about the engine longitudinal centerline axis A. That is, a mean line M defined by each slot 66 is transverse to a concentric circle S defined by the synchronizing ring 40 about axis A (FIG. 2C). Preferably, the slots 66 include a radial assembly opening 64 to receive the slider blocks 52a, 52b in an extended length of the slot 66 to facilitate assembly. Alternatively, the slider blocks 52a, 52b may be formed of a multitude of pieces to facilitate assembly into a slot 66 which does not include a radial assembly opening 64.

Figure 1B:
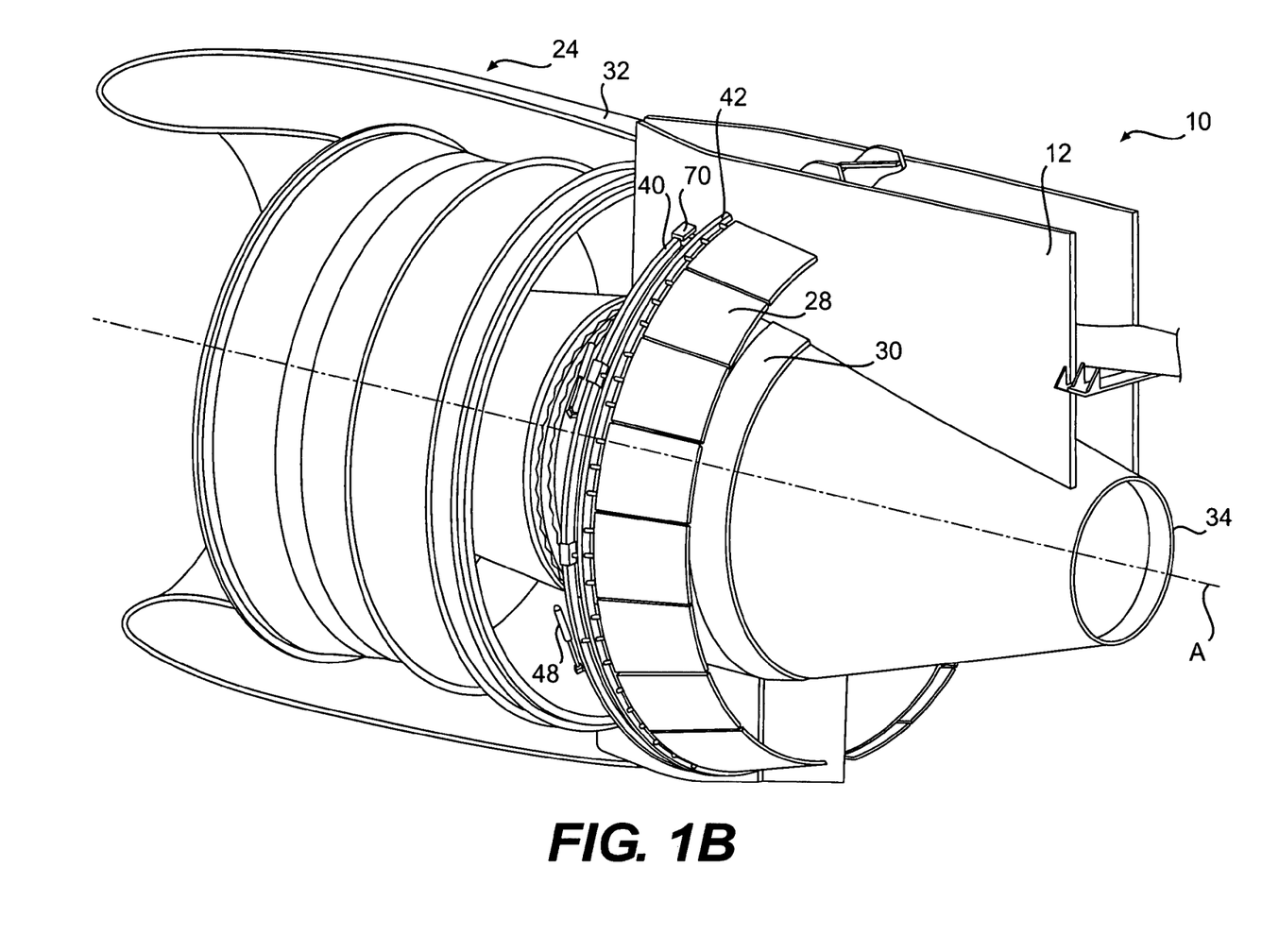
FIG. 1B is a perspective partial fragmentary view of the engine.

The synchronizing ring 40 is mounted within a multitude of slider tracks 70 that are affixed within the fan nacelle 32 (FIG. 1B). Notably, the actuator assembly 48 includes linear actuators which rotate the synchronizing ring 40 thereby transferring relative significant force through a relatively uncomplicated, low-profile system.

Figure 1C:
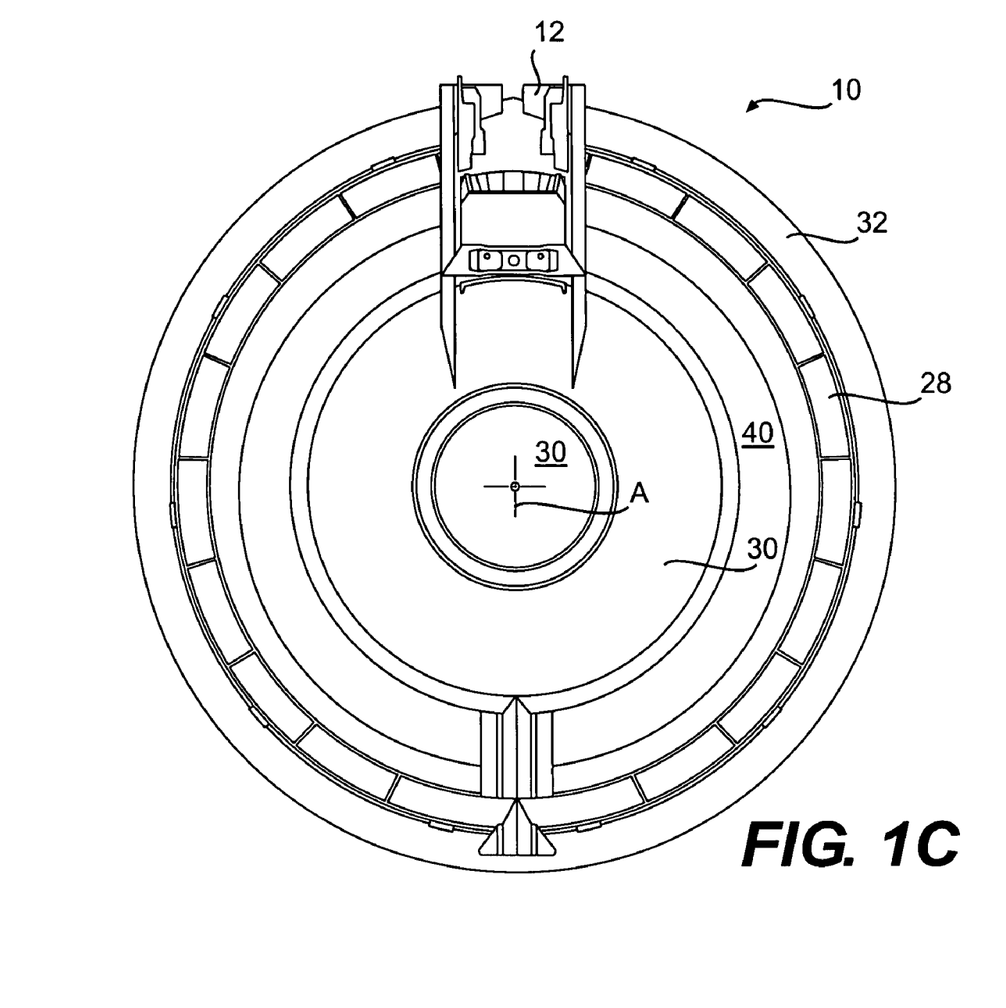
FIG. 1C is a rear view of the engine.
Figure 4A:
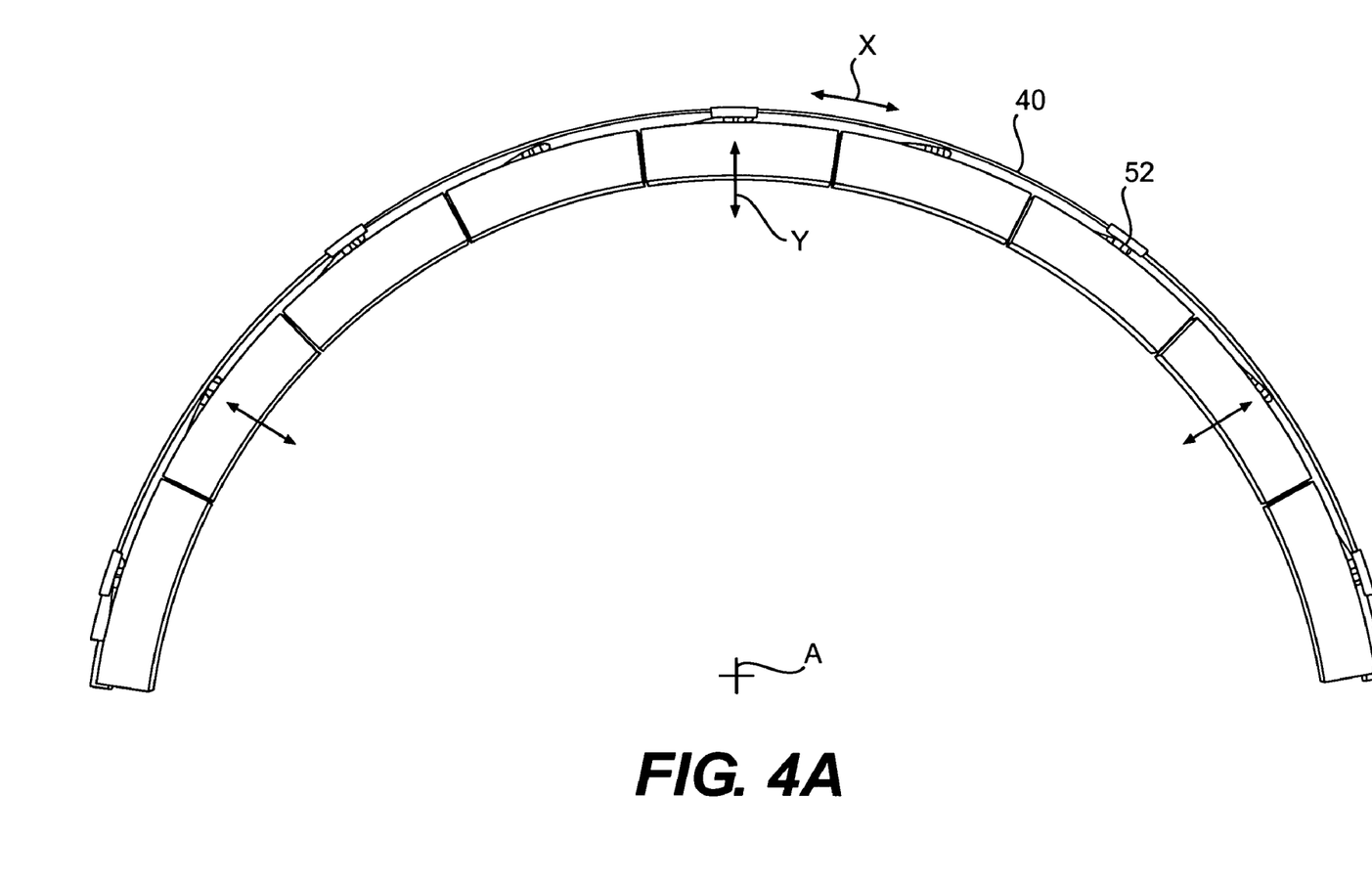
FIG. 4A is a rear view of a section of the FVAN.
Figure 4B:
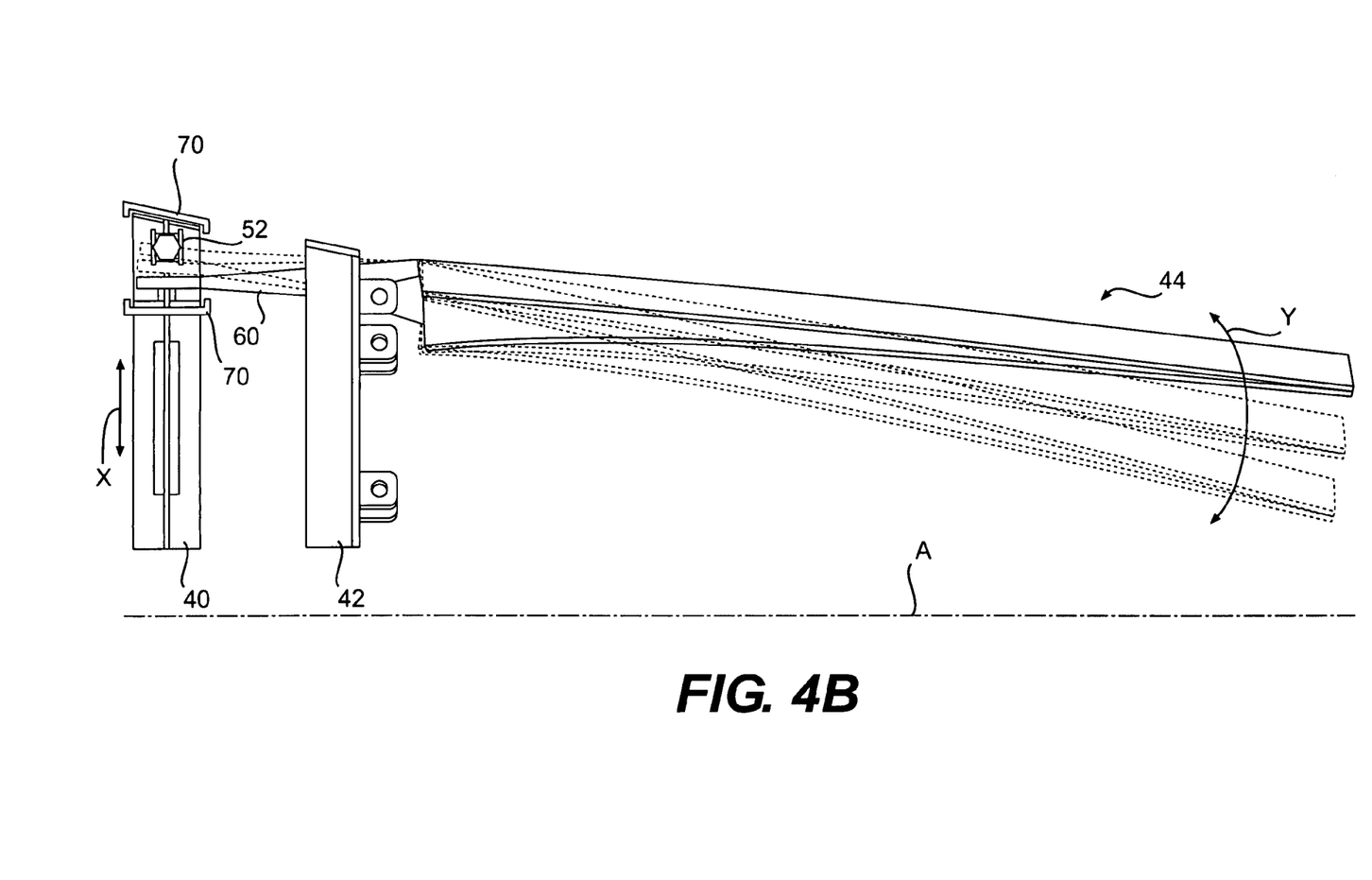
FIG. 4B is a side view of the flap assembly in a multiple of positions.
Figure 4C:
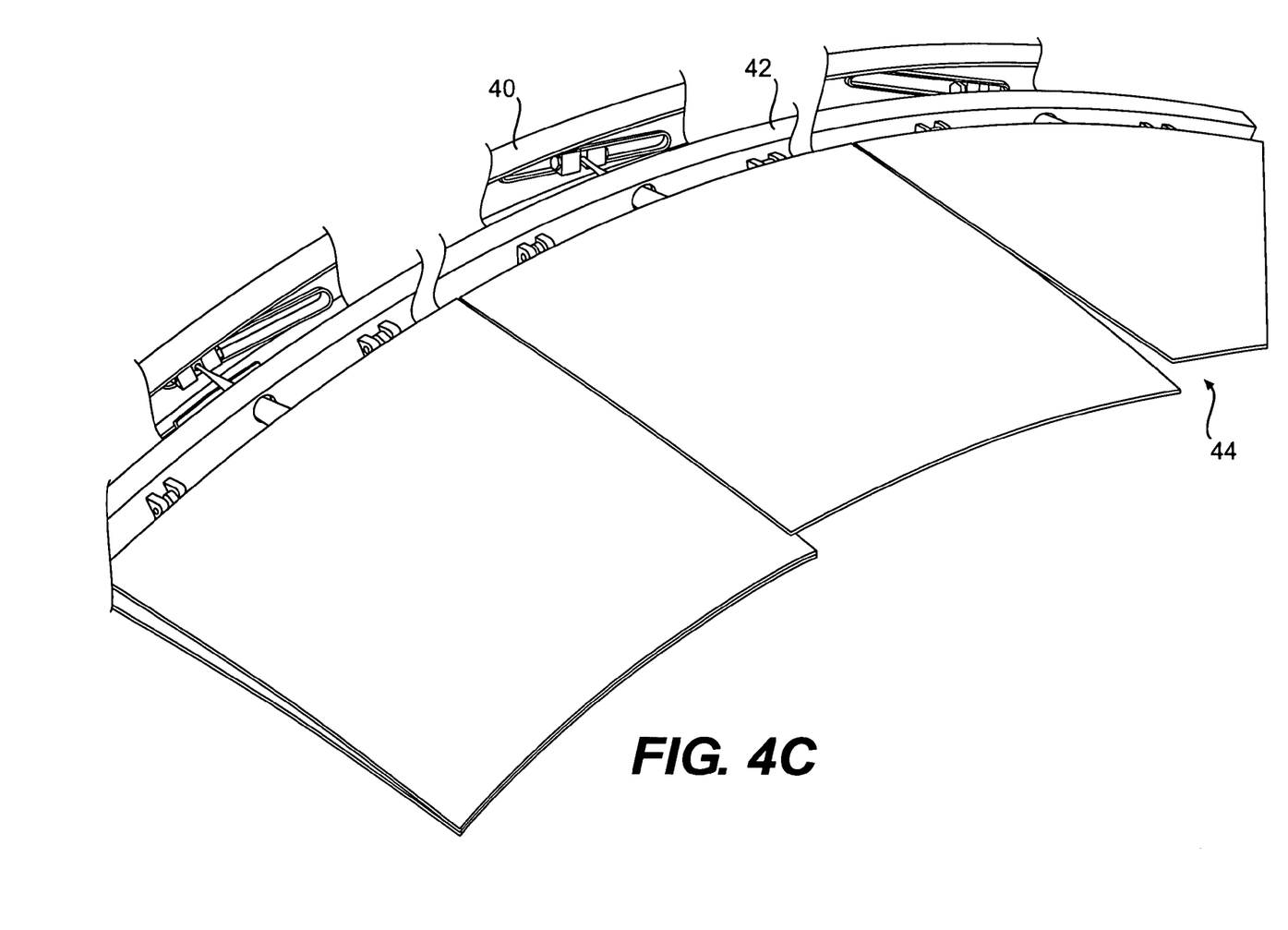
FIG. 4C is a perspective view of the flap assembly in a multiple of positions in which each flap is shown in a different position.

In operation, the actuator assembly 48 rotates the synchronizing ring 40 circumferentially about the engine longitudinal centerline axis A (double headed arrow X; FIG. 4A). The slider block assembly 52 moves within the slot 66 such that the hinge beam rod 60 converts radial moment to tangential moment for flap assembly 44 movement about the flap hinge to vary the diameter of the flap assembly 44 (illustrated in a multiple of exemplary positions in FIGS. 4B and 4C; notably FIG. 4C is exemplary as all flaps move in unison) and thus the annular exit area between the fan nacelle and the core nacelle (FIG. 1C).

By adjusting the FVAN 28, engine trust and fuel economy are maximized during each flight regime. Preferably, the actuator assembly 48 communicates with an engine controller or the like to adjust the position of the FVAN 28. However, other control systems including flight control systems may likewise be usable with the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fan nacelle for a gas turbine engine comprising:
a static ring defined about an engine longitudinal centerline axis;
a flap assembly pivotally mounted to said static ring, said flap assembly includes a multitude of flaps nested together;
a synchronizing ring rotatable about said engine longitudinal centerline axis relative said static ring; and
a linkage mounted to said flap assembly, said linkage includes a hinge beam rod that extends through said static ring and engaged with said synchronizing ring, said linkage operable to adjust an annular fan exit area of said flap assembly in response to rotation of said synchronizing ring about said engine longitudinal centerline axis relative said static ring.

2. The fan nacelle as recited in claim 1, wherein said multitude of flaps are nested together in a tongue and groove arrangement.

3. The fan nacelle as recited in claim 1, wherein said hinge beam rod engages a slider block movable within a slot defined by said synchronizing ring.

4. The fan nacelle as recited in claim 3, wherein said slot defines a mean line transverse to a concentric circle defined by said synchronizing ring about said engine longitudinal centerline axis.

5. The fan nacelle as recited in claim 3, wherein said hinge beam rod engages a pin mounted to said slider block, said pin rotatable relative to said slider block.

6. The fan nacelle as recited in claim 5, wherein each flap of said flap assembly includes a hinge beam and core sandwiched between an upper and a lower skin, said hinge beam rod extends from said hinge beam opposite said core.

7. The fan nacelle as recited in claim 1, further comprising a linear actuator which rotates said synchronizing ring about said engine longitudinal centerline axis relative said static ring.

8. A nacelle assembly for a gas turbine engine comprising:
a fan nacelle defined about an engine longitudinal centerline axis;
a core nacelle at least partially within said fan nacelle;
a flap assembly pivotally mounted to said fan nacelle, said flap assembly includes a multitude of flaps nested together;
a synchronizing ring rotatable about said axis relative to said fan nacelle; and
a linkage mounted to said synchronizing ring and said flap assembly to adjust an annular fan exit area between said fan nacelle and said core nacelle, said linkage includes a hinge beam rod that extends through a static ring and engaged with said synchronizing ring, said linkage operable to adjust an annular fan exit area of said flap assembly in response to rotation of said synchronizing ring about said axis relative said static ring.

9. The nacelle as recited in claim 8, wherein said flap assembly defines an aft most segment of said fan nacelle.

10. The nacelle as recited in claim 8, further comprising: a static ring defined about said axis adjacent to said synchronizing ring, said flap assembly pivotally mounted to said static ring.

11. The nacelle as recited in claim 10, wherein said static ring is intermediate said synchronizing ring and said flap assembly.

12. The nacelle as recited in claim 11, wherein said flap assembly includes a hinge beam rod which extends through said static ring to engage a slider block movable within a slot defined within said synchronizing ring.

13. The fan nacelle as recited in claim 3, wherein said slot is transverse to said engine longitudinal centerline axis.

14. The fan nacelle as recited in claim 1, wherein said hinge beam rod is mounted through an aperture in a hinge pin, said hinge pin mounted for rotation between a first slider block and a second slider block movable within a slot defined by said synchronizing ring.

15. The fan nacelle as recited in claim 14, wherein said hinge pin is mounted for rotation about an axis transverse to said engine longitudinal centerline axis.

16. The fan nacelle as recited in claim 14, wherein said first slider block and said second slider block is movable moves within said slot such that said hinge beam rod converts radial moment to tangential moment for flap assembly movement about a flap hinge to adjust said annular fan exit area.

17. The fan nacelle as recited in claim 14, wherein said slot defines a mean line transverse to a concentric circle defined by said synchronizing ring about said engine longitudinal centerline axis.

18. The fan nacelle as recited in claim 1, wherein synchronizing ring is mounted within a multitude of slider tracks affixed within the fan nacelle.

* * * * *